United States Patent
Xiao (10) Patent No.: US 12,131,161 B2
(45) Date of Patent: Oct. 29, 2024

(54) MULTI-CORE COMMUNICATION THROUGH A COMMUNICATION LAYER VIA A PUBLISH-SUBSCRIBE LAYER

(71) Applicant: BEIJING XIAOMI MOBILE SOFTWARE CO., LTD., Beijing (CN)

(72) Inventor: Xiang Xiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 580 days.

(21) Appl. No.: 17/354,587

(22) Filed: Jun. 22, 2021

(65) Prior Publication Data

US 2022/0291929 A1 Sep. 15, 2022

(30) Foreign Application Priority Data

Mar. 12, 2021 (CN) .......................... 202110270991.5

(51) Int. Cl.
*G06F 9/4401* (2018.01)
*G06F 9/50* (2006.01)
*G06F 9/54* (2006.01)

(52) U.S. Cl.
CPC ............ *G06F 9/441* (2013.01); *G06F 9/5077* (2013.01); *G06F 9/542* (2013.01); *G06F 9/544* (2013.01); *G06F 9/546* (2013.01)

(58) Field of Classification Search
CPC ........ G06F 9/441; G06F 9/5077; G06F 9/542; G06F 9/544; G06F 9/546; G06F 15/173; G06F 9/545; G06F 9/547; G06F 9/3881; G06F 9/3877; G06F 13/1652; G06F 15/167
See application file for complete search history.

(56) References Cited

U.S. PATENT DOCUMENTS 10,289,785 B1 * 5/2019 Panou ................. G06F 9/44505
10,572,405 B1 * 2/2020 Shen .................... B60R 16/0231
(Continued)

FOREIGN PATENT DOCUMENTS

JP    2011141695 A    7/2011
JP    2011211650 A  * 10/2011
(Continued)

OTHER PUBLICATIONS

Rexroat, Proposed Middleware Solution for Resource-Constrained Distributed Embedded Networks, 2014, https://uknowledge.uky.edu/cgi/viewcontent.cgi?article=1060&context=ece_etds, pp. 1-160 (Year: 2014).*

(Continued)

*Primary Examiner* — Meng Ai T An
*Assistant Examiner* — Hsing Chun Lin
(74) *Attorney, Agent, or Firm* — Cozen O'Connor (57) ABSTRACT

The present disclosure relates to a method for multi-core communication, an electronic device and a storage medium. The method includes controlling a plurality of cores to run; establishing a communication connection between a publishing core and a receiving core in the plurality of cores based on a communication layer; performing, by the publishing core, an operation on a topic message through calling a preset interface of the communication layer via a publish-subscribe layer; and accessing the topic message in response to the receiving core calling a preset interface of the publish-subscribe layer.

8 Claims, 5 Drawing Sheets

(56) References Cited

U.S. PATENT DOCUMENTS

| | | | |
|---|---|---|---|
| 2006/0167897 A1* | 7/2006 | Jones | H04L 51/18 |
| 2012/0054477 A1* | 3/2012 | Lubars | G06F 11/1469 |
| | | | 713/300 |
| 2019/0332449 A1 | 10/2019 | Adolfsson et al. | |
| 2020/0409774 A1 | 12/2020 | Xia et al. | |

FOREIGN PATENT DOCUMENTS

| | | | |
|---|---|---|---|
| JP | 2017073688 A | | 4/2014 |
| KR | 20150067332 A | | 6/2015 |
| KR | 20020091057 A | | 12/2022 |
| WO | WO 2019207104 A1 | | 10/2019 |
| WO | WO-2021143190 A1 | * | 7/2021 |

OTHER PUBLICATIONS

Taneishi et al, JP2011211650A Description Translation, Oct. 20, 2011, https://worldwide.espacenet.com/publicationDetails/description?CC=JP&NR=2011211650A&KC=A&FT=D&ND=3&date=20111020&DB=&locale=en_EP, pp. 1-11 (Year: 2011).*

Ungurean, Using Co-Processors to Activate Real Time Capabilities on Fog Nodes, Sep. 21-23, 2018, https://dl.acm.org/doi/pdf/10.1145/3284557.3284700, pp. 1-5 (Year: 2018).*

Li et al. WO2021143190A1 Description Translation, Jul. 22, 2021, <https://worldwide.espacenet.com/publicationDetails/description?CC=WO&NR=2021143190A1&KC=A1&FT=D&ND=3&date=20210722&DB=&locale=en_EP>, pp. 1-64 (Year: 2021).*

Aalto, Dynamic management of multiple operating systems in an embedded multi-core environment, May 7, 2010, <https://core.ac.uk/download/pdf/80702274.pdf>, pp. 1-80 (Year: 2010).*

Masti et al. Logical Partitions on Many-Core Platforms, Dec. 7-11, 2015, <https://dl.acm.org/doi/pdf/10.1145/2818000.2818026>, pp. 1-10 (Year: 2015).*

European Patent Application No. 21182493.3 extended Search and Opinion dated Dec. 13, 2021, 7 pages.

Japanese Patent Application No. 2021-103214, Notice of Allowance dated Jan. 6, 2023, 7 pages.

Japanese Patent Application No. 2021-103214, English translation of Notice of Allowance dated Jan. 6, 2023, 2 pages.

Korean Patent Application No. 10-2021-0074810, Office Action dated Jan. 4, 2023, 5 pages.

Korean Patent Application No. 10-2021-0074810, English translation of Office Action dated Jan. 4, 2023, 5 pages.

* cited by examiner

MULTI-CORE COMMUNICATION THROUGH A COMMUNICATION LAYER VIA A PUBLISH-SUBSCRIBE LAYER

CROSS-REFERENCE TO RELATED APPLICATIONS

This application claims the benefit of priority to Chinese Application No. 202110270991.5, filed on Mar. 12, 2021, the contents of which are incorporated herein by reference in their entirety.

TECHNICAL FIELD

The present disclosure relates to a communication field, and particularly to a method for multi-core communication, an electronic device and a storage medium.

BACKGROUND

Embedded systems are widely used in electronic devices such as mobile phones and Internet of Things (JOT) devices. With the development of technology, embedded systems have evolved from single-core systems to multi-core systems to improve the performance of electronic devices. With the development of multi-core embedded systems, communication and interaction are needed between the multiple cores. Especially for single-chip multi-core systems, multi-core on-chip communication has become a problem faced by the multi-core systems. The quality of the communication mechanism directly affects the performance of the multi-core system, and an efficient communication mechanism is also an important guarantee for high performance of the multi-core system.

SUMMARY

In order to overcome the problems in the related art, a method for multi-core communication, an electronic device, and a storage medium are provided in the present disclosure.

According to a first aspect of the embodiments of the present disclosure, there is provided a method for multi-core communication, applicable to a multi-core communication system including a plurality of cores, a publish-subscribe layer, and a communication layer, the method includes: controlling the plurality of cores to run; establishing a communication connection between a publishing core and a receiving core in the plurality of cores based on the communication layer; performing, by the publishing core, an operation on a topic message through calling a preset interface of the communication layer via the publish-subscribe layer, in which the operation includes one of the following: publication of the topic message and broadcast of a topic name of the topic message; and accessing the topic message in response to the receiving core calling a preset interface of the publish-subscribe layer. The accessing includes one of the following: obtaining the topic message, and subscribing to the topic message.

According to a second aspect of the embodiments of the present disclosure, there is provided an electronic device, including: a processor; a memory configured to store instructions executable by the processor; in which, the processor is configured to execute the method for multi-core communication as described above.

According to a third aspect of the embodiments of the present disclosure, there is provided a non-transitory computer-readable storage medium. When instructions in the storage medium are executed by a processor of an electronic device, the electronic device is caused to execute the method for multi-core communication as described above.

It is understandable that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embedded systems are widely used in electronic devices such as mobile phones and Internet of Things (IOT) devices. With the development of technology, embedded systems have evolved from single-core systems to multi-core systems to improve the performance of electronic devices. In a multi-core embedded system, a plurality of cores may be packaged in a single chip, for example, AP, Modem DSP, Audio DSP and Sensor DSP, and the like. It can also be that a plurality of chips each including a single core are designed on a single board. Or a combination of the above two methods may be possible.

There are two forms of multi-core embedded systems, Asymmetric Multi-Processing (AMP) and Symmetric Multi-Processing (SMP).

The AMP architecture usually includes a plurality of CPUs, and different CPUs are in different system architectures. Each CPU has an independent address space, and each CPU can run its own operating system (OS). The AMP architecture provides hardware resources for the plurality of CPUs to communicate with each other. For example, a mobile phone SOC (System on chip) is in the AMP architecture. There are a plurality of DSPs and an application processor (AP) in the SOC, which can run their respective OSs.

The SMP architecture usually includes a plurality of CPUs, and the plurality of CPUs have the same system architecture and share memory space with each other. SMP has an OS and distributes tasks to the plurality of CPUs, and CPUs communicate with each other through the shared memory. For example, a desktop computer is in the SMP architecture, and CPUs execute tasks in parallel to improve performance.

With the development of multi-core embedded systems, communication and interaction are needed between the plurality of cores. Especially for the single-chip multi-core system, multi-core on-chip communication has become a problem faced by multi-core systems. The quality of the communication mechanism directly affects the performance of the multi-core system, and an efficient communication mechanism is also an important guarantee for high performance of the multi-core system.

In the related art, the multi-core communication can adopt, for example, QMI (Qualcomm Messaging Interface) architecture. Each application in the QMI architecture can communicate and interact with an external Service by using a corresponding Client API. Intermediate components in the QMI architecture provide capabilities, such as data encapsulation, forwarding, and decapsulation.

The method in the related art has the following technical problems: QMI is a private technology of the related platform, which is not completely open and cannot be promoted and applied. Therefore, there is a lack of methods for effective communication and data-sharing between a plurality of cores in the related art.

In order to solve the technical problems in the related art, there is provided a method for multi-core communication, applicable to a multi-core communication system including a plurality of cores, a publish-subscribe layer, and a communication layer. The method includes: controlling the plurality of cores to run; establishing a communication connection between a publishing core and a receiving core in the plurality of cores based on the communication layer; performing, by the publishing core in the plurality of cores, publication of a topic message or broadcast of a topic name of the topic message through calling a preset interface of the communication layer via the publish-subscribe layer; and subscribing or obtaining the topic message in response to the receiving core calling a preset interface of the publish-subscribe layer. Using the method of the present disclosure, the communication connection between the plurality of cores and the transfer of topic messages between the plurality of cores can be realized based on the interactive publish-subscribe layer and communication layer. An effective mechanism for subscribing and publishing messages between the plurality of cores is established, making it easier and faster to share data between the plurality of cores.

In an example embodiment, the method for multi-core communication of the embodiment is applicable to a multi-core communication system. The multi-core communication system includes a plurality of cores, a publish-subscribe layer, and a communication layer. The multi-core communication system may be based on the AMP architecture or the SMP architecture. In this embodiment, the description is made to the system based on the AMP architecture.

The plurality of cores may include a master core and a remote core, and the plurality of cores may be, for example, integrated on the same chip.

The publish-subscribe layer can be, for example, a uORB (Micro Object Request Broker) mode. uORB adopts an asynchronous communication mechanism, which can realize the publication and subscription of messages between a plurality of cores, thereby realizing data sharing between cores.

For example, the communication layer may adopt a TCP/IP mode or a Bluetooth mode to implement an IPC (Inter Processor Communication) function. In this embodiment, the communication layer adopts the OpenAMP architecture mode. The communication layer of the OpenAMP architecture mode can include three sublayers: Remoteproc, Virtio, and Rpmsg.

Figure 1:
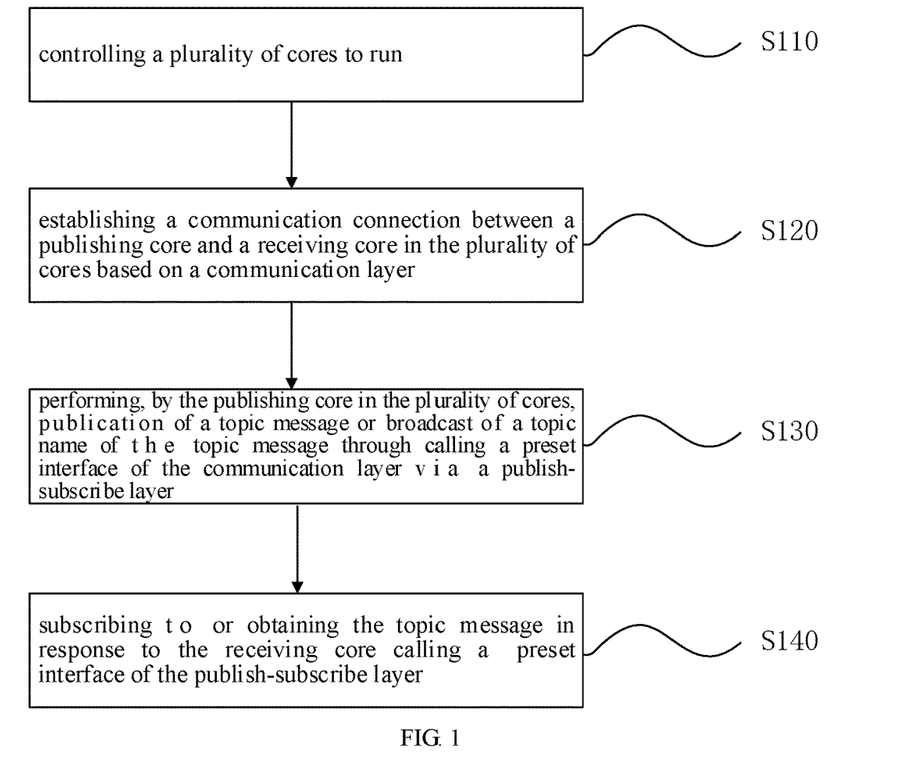
FIG. 1 is a flow chart illustrating a method according to an example embodiment.

As illustrated in FIG. 1, the method of this embodiment includes the following.

In block S110, the plurality of cores are controlled to run.

In block S120, a communication connection between a publishing core and a receiving core in the plurality of cores is established based on the communication layer.

In block 130, the publishing core in the plurality of cores performs publication of a topic message or broadcast of a topic name of the topic message through calling a preset interface of the communication layer via the publish-subscribe layer.

In block S140, the topic message is subscribed to or obtained in response to the receiving core calling a preset interface of the publish-subscribe layer.

In block S110, the Remoteproc sublayer in the communication layer of the OpenAMP architecture mode can realize the function of booting remote proc. For example, the master core of the plurality of cores can be booted first, and then the remote core can be booted.

In block S120, the Rpmsg sublayer in the communication layer of the OpenAMP architecture mode can realize the communication connection between the plurality of cores, that is, the IPC function can be realized. For example, the publishing core may be any one of the plurality of cores, which refers to the core that publishes topic messages. The receiving core may be, for example, at least one core other than the publishing core in the plurality of cores.

In block S130, the preset interface may be, for example, an Rpmsg interface. The topic message may include, for example, topic name, message content, and publishing type. The topic message can be, for example, accelerometer data, audio data, Bluetooth® Wi-fi® status, and any intermediate quantity generated by the system. Each topic message has a unique name and a corresponding structure. The structure includes description of a topic state, for example the acceleration data includes acceleration vectors on three-axes x, y, and z and a time stamp message.

The publishing core can perform two operations on the topic message: the broadcast of the topic message, that is, broadcasting the topic name, and the publication of the topic message.

When publishing core broadcasts or publishes the topic message, it can first call the set interface (API) of the publish-subscribe layer uORB, and internally call the set interface of the communication layer (openAMP) through the set interface of uORB to realize the broadcast or publication of the topic message. The internal of the set interface of uORB can include, for example, Rpmsg-based register information or a call instruction. The set interface may include: a first set interface, a second set interface, and a third set interface.

In this block, the Rpmsg sublayer is a device type and bus above the Virtio sublayer. The Virtio sublayer can be accessed by calling the Rpmsg interface, so as to realize message transmission and reception. The communication layer also has a share memory module, and a share memory module can be shared between every two cores.

Figure 6:
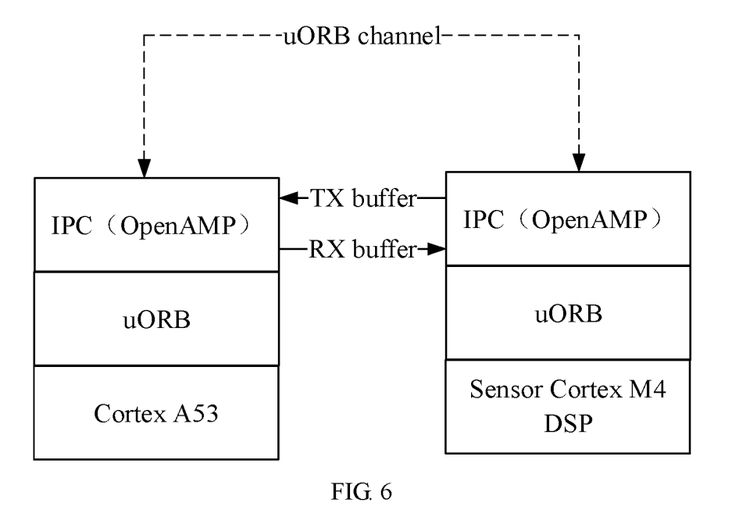
FIG. 6 is a schematic diagram illustrating a system architecture according to an example embodiment.

As illustrated in FIG. 6, the Virtio sublayer includes a buffer entity (buffer) integrated on the share memory module for message transmission and reception. The buffer entity includes a TX buffer and a RX buffer. Messages can be transmitted through the TX buffer, and messages can be received through the RX buffer.

In this embodiment, the plurality of cores use the API of the uORB consistent with the core interface, and the communication layer of the OpenAMP architecture mode is used as a back end of the publish-subscribe layer (uORB) to provide the plurality of cores with the IPC function. There are a few API interfaces, which is conducive to developing and utilizing.

In block S140, the set interface may be, for example, the third set interface of uORB. The third set interface includes an orb_subscribe and an orb_copy, which can be used to subscribe to or obtain the published topic message, so as to realize message transmission or sharing between the plurality of cores.

Figure 2:
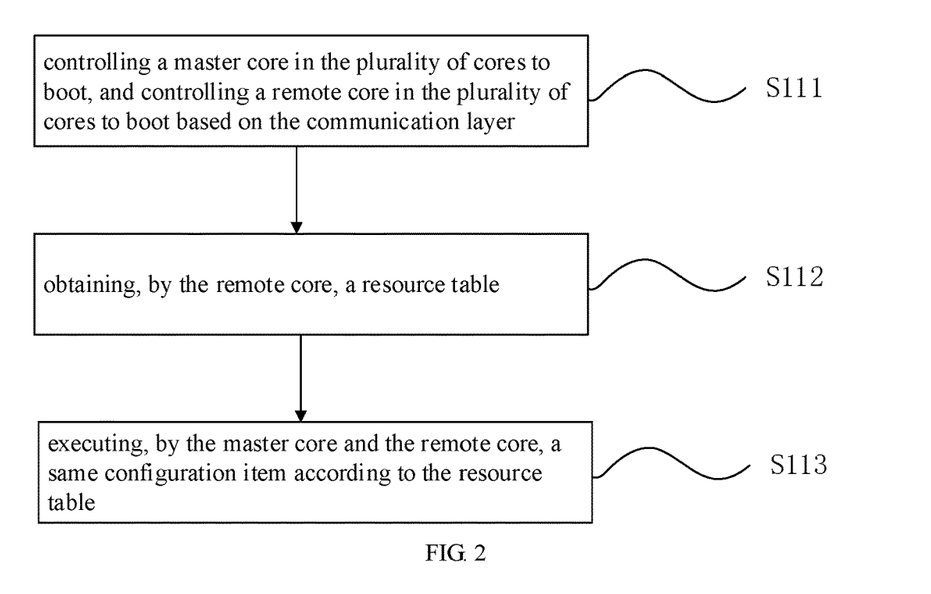
FIG. 2 is a flow chart illustrating a method according to an example embodiment.

In an example embodiment, as illustrated in FIG. 2, the method of this embodiment may specifically include the following.

In block S111, a master core in the plurality of cores is controlled to boot, and a remote core in the plurality of cores is controlled based on the communication layer to boot.

In block S112, the remote core obtains a resource table.

In block S113, the master core and the remote core execute a same configuration item according to the resource table.

In block S111, the Remoteproc sublayer in the communication layer can provide life cycle and resource management of the remote system, for example, by loading the remote system image to a fixed location to boot remote proc; by creating and managing remote system resources to suspend, resume, and shutdown the remote system.

In this block, the master core is energized and booted up first, and after it is booted, the remote system image can be loaded and parsed, and then the process jumps forward to boot the remote core.

In block S112, after the master core is booted and initialized, the resource table in the ELF file format may be loaded into a corresponding address space. The remote core obtains the resource table from the address space, so that the resource table of the remote core is consistent with the resource table in the master core. The resource table is defined by the master core, and includes a plurality of configuration items such as the regional division principle of an inter-core buffer (the buffer is integrated in the share memory module).

In an embodiment, an audio chip is taken as an example for the multi-core communication system. The chip has 3 cores: two Cortex M4 cores and one Cortex A53 core. Cortex M4 DSP is responsible for sensor data collection and algorithm processing, Cortex M4 DSP is responsible for audio data collection and algorithm processing, and Cortex A53 is responsible for AI algorithm acceleration and user interface (UI) interaction. One of the two Corte M4 cores collects sensor data and the other collects audio data to perform operations of filter fusing, encoding and decoding. The Cortex A53 chip uses some data from the other two cores for AI algorithm learning and deduction, and is responsible for displaying in the UI. In this embodiment, Cortex A53 is an AP processor, which is energized and booted up first. After booting, it jumps forward to boot the other two cores. Cortex A53 runs Linux OS, and Cortex M4 runs RTOS (Real-time Operating System).

In block S113, the resource table of the master core is consistent with the resource table of the remote core. In the master core and the remote core, corresponding loadings can be respectively performed according to the configuration items in the two resource tables.

For example, the resource table includes the regional division principle of the inter-core buffer. The buffer is the buffer entity located on the share memory module, and the master core and the remote core divide the buffer in the same way according to the resource table.

For another example, the resource table also includes the byte unit of storage of the buffer. Then the master core and the remote core align the buffer in units according to the resource table, that is, the same byte unit of storage is set for the buffer.

It is understandable that the communication layer can create a vring according to the resource table. The vring includes the following parameters: a number, a size, and an alignment scheme of a buffer entity.

In this embodiment, openAMP and uORB have less platform dependency and are easy to transplant, such as transplanting from their original platforms to the operating system platform of a mobile phone. The negotiated resource table is configured between the plurality of cores, for performing division and unit alignment of the buffer, and the remaining mechanisms can be implemented uniformly by relying on openAMP.

Figure 3:
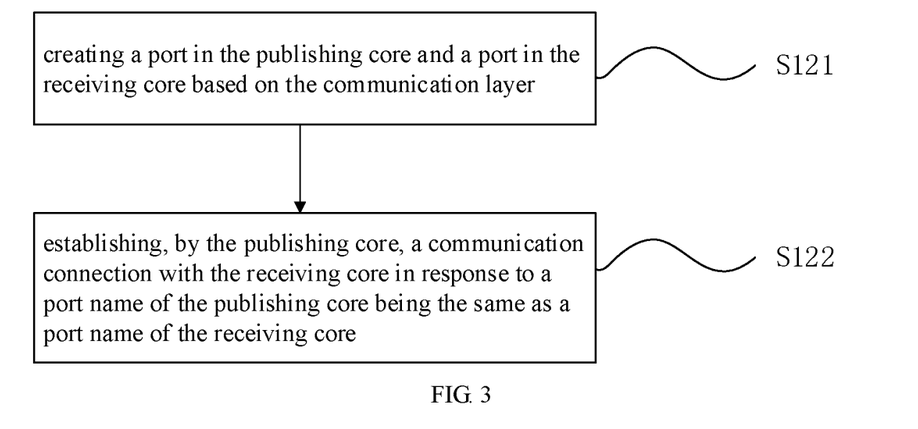
FIG. 3 is a flow chart illustrating a method according to an example embodiment.

In an example embodiment, as illustrated in FIG. 3, block S120 of this embodiment may specifically include the following.

In S121, a port in the publishing core and a port in the receiving core are created based on the communication layer.

In S122, the publishing core establishes a communication connection with the receiving core in response to a port name of the publishing core being the same as a port name of the receiving core.

In block S121, in the Rpmsg sublayer of the communication layer, an API with a prefix of rpmsg is set. The publishing core and the receiving core can respectively call the API of rpmsg through the publish-subscribe layer (uORB) to create the ports. In this embodiment, when the API of rpmsg is called at the publish-subscribe layer, the API of rpmsg may include a function or instruction for "creating a port", so that the publishing core and the receiving core create the ports respectively.

In block S122, the port name refers to a name of a process allowed by the port. In an embodiment, when the publishing core and the receiving core implement a process of uORB based on the communication connection, the port created on the publishing core may be, for example, an orb_transmit, and the port created on the receiving core may be, for example, an orb_receive. The names of the two ports are the prefix "orb". When the names are the same, the two cores can be bound, that is, names are used to and perform recognition and communication connection between the plurality of cores.

It is understandable that a virtual channel is formed between the ports of the publishing core and the receiving core, and the message publication and reception of different processes is still realized through the TX buffer and RX buffer in the buffer entity. The publication of the publisher and the reception of the subscriber use completely separate buffers, so that the publication and subscription will not affect each other and wait for each other. The Rpmsg sublayer also includes Name Service, which can convert the port name to the port number and the name is also a name of a virtual channel of an upper layer of Rpmsg.

For the communication between the publishing core and the receiving core, there is a buffer in the communication layer, that is, a TX buffer and a RX buffer. However, depending on different processes in communication, there can be a plurality of ports on the core, and a plurality of virtual channels can be included between the cores so as to perform a plurality of processes except for the ORB process.

When, in a plurality of cores, the master core is the publishing core and all other cores are receiving cores, an independent virtual channel is needed to be created between the master core and any receiving core, so that the master core and any receiving core can realize the message publication and subscription.

In an example embodiment, the method of this embodiment is applicable to a scenario where the publishing core broadcasts a message, that is, by broadcasting the topic name of the topic message.

Figure 4:
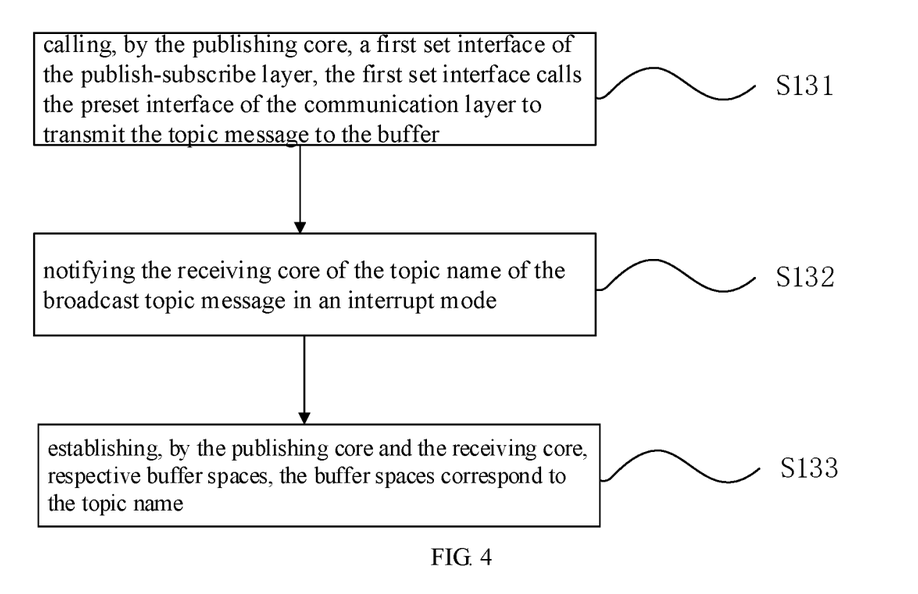
FIG. 4 is a flow chart illustrating a method according to an example embodiment.

As illustrated in FIG. 4, block S130 specifically includes the following.

In S131, the publishing core calls a first set interface of the publish-subscribe layer, in which the first set interface is configure to call the preset interface of the communication layer to transmit the topic message to a buffer.

In S132, the receiving core is notified of the topic name of the broadcast topic message in an interrupt mode.

In S133, the publishing core establishes a buffer space and the receiving core establishes a buffer space, in which the buffer space corresponds to the topic name.

In block S131, the first set interface may be, for example, the API on uORB (the publish-subscribe layer): an orb_advertise. The preset interface can be, for example, the API on the Rpmsg sublayer in openAMP communication layer: an rpmsg_send_message.

In this block, when the publishing core calls the orb_advertise, the orb_advertise internally calls the rpmsg_send_message to transmit the topic message to the buffer.

In block S132, the interrupt mode (IRQ) of the openAMP itself is used to notify the receiving core of the topic name of the broadcast topic message. The receiving core is informed that there is a topic message in the buffer.

In block S133, the publishing core may establish the buffer space (buffer) in the core when/before the orb_advertise is called. The purpose of this block is to indicate that there is a buffer space in the publishing core, but not to limit the timing of establishing the buffer space. The receiving core may establish the buffer space in the core after receiving the broadcast message.

In this block, the buffer space in the publishing core or in the receiving core corresponds to the topic name involved, which reflects in two aspects.

In the first aspect, the amount of buffer spaces in the publishing core or the receiving core is the same as the number of topic names (the total number of publication and subscription). That is, for each topic name, there is a corresponding buffer space of the topic name in the publishing core or the receiving core.

In the second aspect, the name of the buffer space in the publishing core or the receiving core is the same as the topic name. That is, in the publishing core or the receiving core, the buffer space of the corresponding name caches the topic message corresponding to the topic name.

Figure 7:
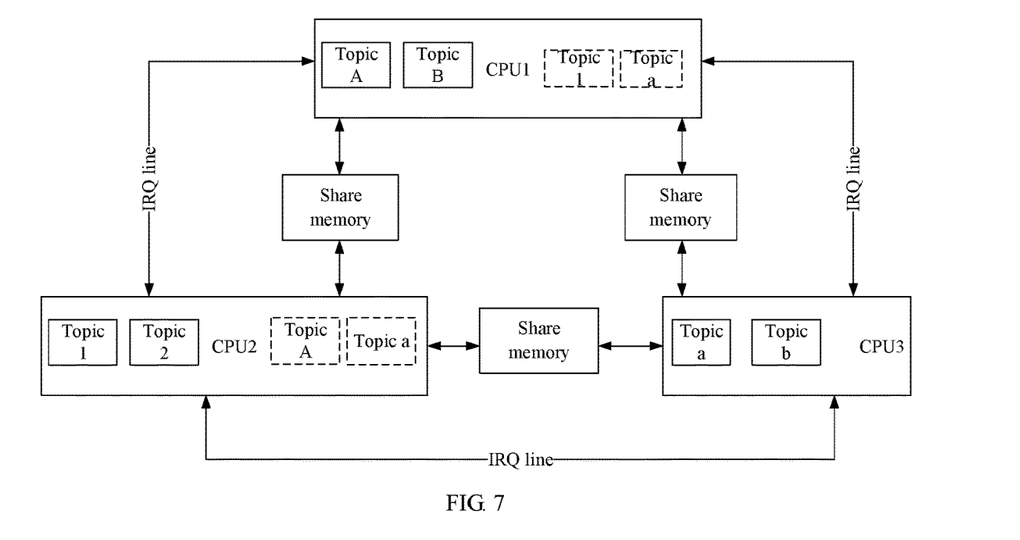
FIG. 7 is a schematic diagram illustrating a multi-core architecture according to an example embodiment.

In an embodiment, as illustrated in FIG. 7, this embodiment includes three cores (CPUs), namely: CPU1, CPU2, and CPU3. A share memory module is set between every two cores, that is, there is a buffer between every two cores. Each core can publish a topic message and broadcast it to other cores in an interrupt mode (IRQ line).

CPU1 can publish topic A and topic B, and subscribe to topic 1 on CPU2 and topic a on CPU3. CPU1 correspondingly includes four buffer spaces for topic A, topic B, topic 1, and topic a.

CPU2 can publish topic 1 and topic 2, and subscribe to topic A on CPU1 and topic a on CPU3. CPU2 correspondingly includes four buffer spaces for topic 1, topic 2, topic A, and topic a.

CPU3 can publish topic a and topic b, and there is no subscription yet. CPU3 correspondingly includes two buffer spaces for topic a and topic b.

In an example embodiment, the method of this embodiment is applicable to a scenario where the publishing core publishes a topic message.

This embodiment may be implemented on the basis of the embodiment illustrated in FIG. 4. The block S130 further includes the following.

In S134, the publishing core calls a second set interface of the publish-subscribe layer, in which the second set interface is configured to call the preset interface of the communication layer to publish the topic message in a buffer.

The second set interface may be, for example, the API interface on uORB (the publish-subscribe layer): an orb_publish. The preset interface can be, for example, the API on the Rpmsg sublayer in openAMP communication layer: an rpmsg_send_message.

In this block, when the publishing core calls the orb_publish, the orb_publish internally calls the rpmsg_send_message to publish the topic message on the buffer.

It is understandable that the publishing core can simultaneously call the first set interface (orb_advertise) and the second set interface (orb_publish) to broadcast and publish the message.

Figure 5:
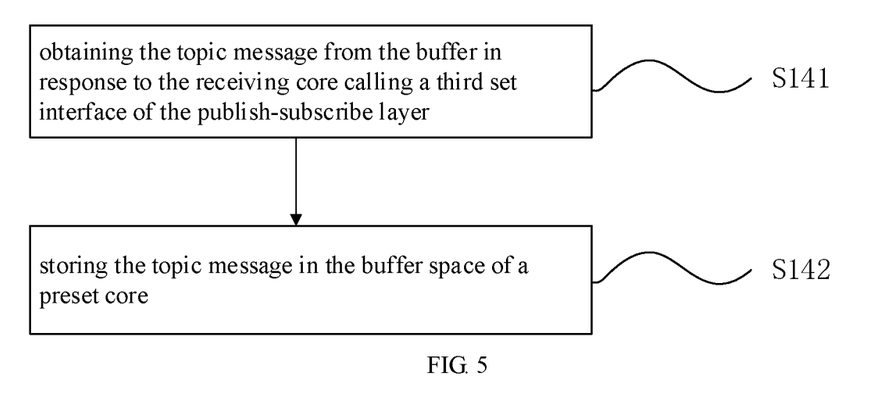
FIG. 5 is a flow chart illustrating a method according to an example embodiment.

In an example embodiment, in the scenario of the publishing core publishing the topic message, as illustrated in FIG. 5, block S140 specifically includes the following.

In block S141, the topic message is obtained from the buffer in response to the receiving core calling the third set interface of the publish-subscribe layer.

In block S142, the topic message is stored in a buffer space of a preset core.

In block S141, the third set interface includes an orb_subscribe and an orb_copy of uORB (the publish-subscribe layer).

The receiving core can determine whether to subscribe to the message according to the topic name. When the receiving core calls the third set interface (orb_subscribe, orb_copy), it indicates that the receiving core is a subscriber. By calling the orb_subscribe, subscription of the topic message can be performed and a refresh status of the topic message in the buffer can be monitored. When the topic message is updated, the receiving core may further call the orb_copy to obtain specific content of the topic message from the buffer.

It is understandable that the topic name of the topic message is unique, and any receiving core that has a subscription requirement can only obtain the corresponding topic message through the agreed topic name.

In block S142, after obtaining the topic message, the receiving core may store the topic message in the buffer space in its own core.

The communication mode of Rpmsg is an asynchronous communication mode. In combination with the above embodiments, in the communication between the publishing core and the receiving core, after the publishing core calls the preset interface rpmsg_send_message of the communication layer through uORB, the communication layer based on the openAMP architecture will call a receiving callback of the receiver (receiving core) to respond to this communication, which is the interrupt mode (IRQ) in openAMP communication. In each transmission between the publishing core and the receiving core, the interrupt mode can be used to realize that the publishing core informs the receiving core of existence of the topic message, and the receiving core informs the publishing core that the topic message is completely obtained.

In an example embodiment, description is made by regarding the publishing core as a master core and the receiving core as a remote core.

(1) The master core calls the orb_advertise and the orb_publish to publish and broadcast the topic message.

Publication of the topic message: the master Core publishes the topic message, which can be stored in the buffer space of the topic in the master core. At the same time, the topic message is encapsulated and transmitted to a virtio layer buffer entity (the inter-core buffer) of the share memory module through the method of calling the uORB interface by the master core and the method of internally calling the rpmsg interface by the uORB interface.

Broadcast of the topic message: the interrupt mode is used to notify the remote core that there is valid message to be read.

(2) Subscription of the topic message: After reception of an interruption, the remote core reads the broadcast message (the topic name of the topic message). The remote core calls the orb_subscribe to subscribe to the topic message and monitor the topic message. When the topic message is updated, the orb_copy is called to get the latest topic message from the buffer and decapsulate the message. The corresponding message of the buffer is cleared, and the interrupt mode is used to notify the master core to respond, and the transmission ends.

Figure 8:
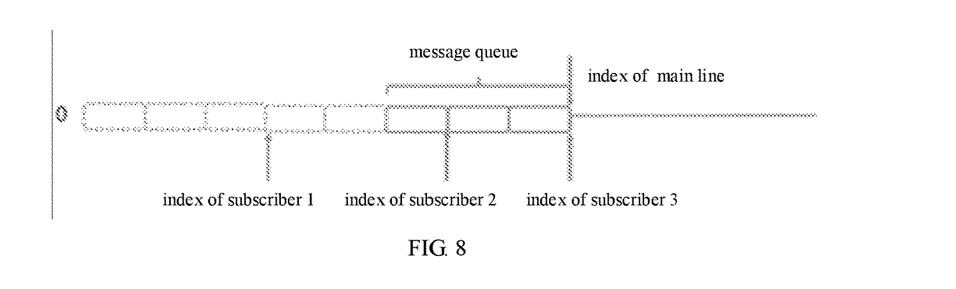
FIG. 8 is a schematic diagram illustrating a principle of subscription mechanism according to an example embodiment.

When the publisher calls the orb_advertise, a buffer space (buffer) is established inside the publisher. Each orb_publish of the publisher is a process of filling the buffer space and increasing the index value. As illustrated in FIG. 8, when each subscriber obtains topic data (orb_copy), the index value of its own buffer space is compared with the index value of the publisher's buffer space. When the index value of the subscriber's buffer space is less than the index value of the publisher's buffer space, it indicates that there is updated topic message, such as subscribers 1 and 2. Otherwise, there is no update, such as subscriber 3.

A few examples are listed below for description, but the embodiments of the present disclosure are not limited to the below.

In an example embodiment, the plurality of cores includes two cores, in which one core is used as the publishing core, and the other core is used as the receiving core.

This embodiment takes the publication or acquisition of the acceleration topic message between the plurality of cores as an example. Sensor DSP collecting acceleration data serves as the publishing core; Cortex A53 requiring acceleration data serves as the receiving core.

When the Sensor DSP collects the acceleration data, it can publish a topic message: "sensor_accel", which includes x-axis, y-axis, and z-axis data of the acceleration and a time stamp. The APIs of uORB: orb_advertise and orb_publish are called when publishing. The APIs of uORB will internally call the rpmsg interface of the openAMP to publish the acceleration topic message. At the same time of publishing, the topic message is broadcast in an interrupt mode.

When Cortex A53 wants to obtain the acceleration data, it can subscribe by calling the orb_subscribe and monitor whether the returned fd is readable. When it is readable (indicating that there is updated data), the orb_copy is called to obtain the latest data of the topic.

In an example embodiment, the plurality of cores includes three cores: A core, B core, and C core. A core can be used as the publishing core, and B core and C core can be used as the receiving cores.

When A core collects data, it can call the APIs of uORB: orb_advertise and orb_publish. The APIs of uORB will internally call the rpmsg interface of the openAMP to publish the topic message to the buffer. At the same time of publishing, the topic message is broadcast in an interrupt mode.

B core and C core receive the broadcast message. By viewing the topic name of the broadcast message respectively, when B core is not interested in this topic message, it will not subscribe. When C core needs to obtain this topic message, it calls the orb_subscribe to subscribe to this topic message. C core real-time monitors the update status of the message in the buffer between A core and C core. When there is an update in the topic message, the rb_copy is called to obtain the latest data of the topic.

In an example embodiment, the plurality of cores includes three cores: A core, B core and C core. A core and B core are used as the publishing cores, and C core is used as the receiving core.

When A core and B core collect data respectively and data is needed to be published, the APIs of uORB: orb_advertise and orb_publish can be called respectively on their cores. The APIs of uORB will internally call the rpmsg interface of the openAMP to publish the topic message respectively. At the same time of publishing, the topic message is broadcast in an interrupt mode.

C core receives the broadcast messages from A core and B core. By viewing the topic names of the broadcast messages respectively, when C core needs to subscribe to the messages of the other two cores, C core calls the orb_subscribe to respectively subscribe to the topic messages of A core and B core. C core real-time monitors the message update status of the buffer between A core and C core, and the message update status of the buffer between B core and C core. When there is updated topic messages, C core calls the orb_copy to respectively obtain the latest topic data. It is understandable that in C core, there is a corresponding buffer space for the subscribed topic messages of A core and B core.

In an example embodiment, the plurality of cores includes four cores: A core, B core, C core, and D core. A core and B core are used as publishing cores, and C core and D core are used as receiving cores.

When A core and B core collect data respectively and the data is needed to be published, the APIs of uORB: orb_advertise and orb_publish can be called respectively on their cores. The APIs of uORB will internally call the rpmsg interface of the openAMP to publish the topic message. At the same time of publishing, the topic message is broadcast in an interrupt mode.

Both C core and D core can receive broadcast messages of A core and B core. By viewing the topic names of the broadcast messages respectively, when C core and D core all need to subscribe to the messages of A core and B core, each subscribing core calls the orb_subscribe to subscribe to the topic message of each publishing core. C core real-time monitors the message update status of the buffer between A core and C core, and the message update status of the buffer between B core and C core. D core real-time monitors the message update status of the buffer between A core and D core, and the message update status of the buffer between B core and D core. When there is an updated topic message, the subscribing core calls the orb_copy to obtain the latest topic data.

It is understandable that the above embodiments mainly describe the subscription and publication of topic messages, and based on the same framework and principle, the method for multi-core communication in the present disclosure can also realize message unsubscription, remote advertisement/cancellation of advertisement of the topic message, and other communication processes.

Figure 9:
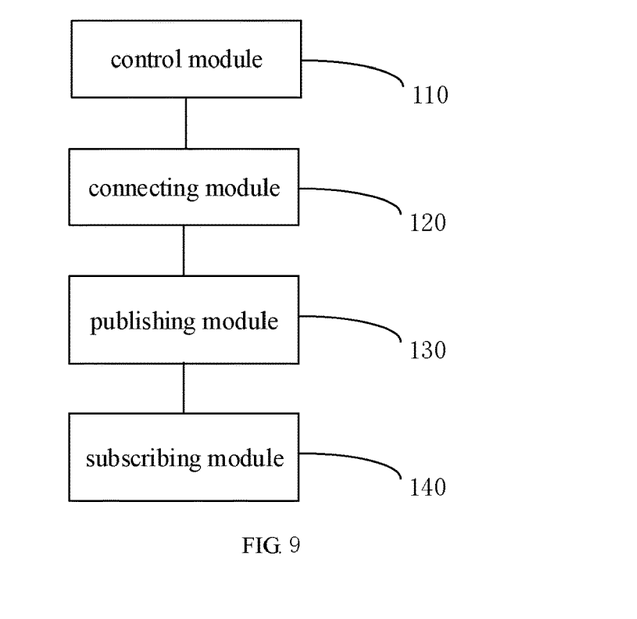
FIG. 9 is a block diagram illustrating an apparatus according to an example embodiment.

In an example embodiment, there is also provided an apparatus for multi-core communication, which is applicable to a multi-core communication system. The multi-core communication system includes a plurality of cores, a publish-subscribe layer, and a communication layer. As illustrated in FIG. 9, the apparatus of this embodiment includes: a control module 110, a connecting module 120, a publishing module 130 and a subscribing module 140. The apparatus of this embodiment is used to implement the method illustrated in FIG. 1. The control module 110 is configured to control the plurality of cores to run. The connecting module 120 is configured to establish a communication connection between a publishing core and a receiving core in the plurality of cores based on the communication layer. The publishing module 130 is configured to perform, by the publishing core in the plurality of cores, publication of a topic message or broadcast of a topic name of the topic message through calling a preset interface of the communication layer via the publish-subscribe layer. The subscribing module 140 is configured to subscribe to or obtain the topic message in response to the receiving core calling a preset interface of the publish-subscribe layer.

In an example embodiment, still referring to FIG. 9, the control module 110 is specifically configured to: control a master core in the plurality of cores to boot, and control a remote core in the plurality of cores to boot based on the communication layer; obtain, by the remote core, the resource table, in which the table is defined by the master core, and the resource table includes: an regional division principle of an inter-core buffer; and execute, by the master core and the remote core, a same configuration item according to the resource table. The connecting module 120 is specifically configured to: establish respective ports in the publishing core and the receiving core based on the communication layer; and establish, by the publishing core, the communication connection with the receiving core in response to a port name of the publishing core being the same as a port name of the receiving core.

In an example embodiment, still referring to FIG. 9, the publishing module 130 is specifically configured to: call, by the publishing core, a first set interface of the publish-subscribe layer, in which the first set interface is configured to call the preset interface of the communication layer to transmit the topic message to a buffer; and notify the receiving core of the topic name of the broadcast topic message in an interrupt mode. When the publishing core calls the first set interface of the publish-subscribe layer, the publishing module 130 is further configured to: establish, by the publishing core and the receiving core, respective buffer spaces, in which the buffer spaces correspond to the topic name.

In an example embodiment, still referring to FIG. 9, the publishing module 130 is configured to: call, by the publishing core, a second set interface of the publish-subscribe layer, in which the second set interface is configured to call the preset interface of the communication layer to publish the topic message in a buffer. The subscribing module 140 is specifically configured to: obtain the topic message from a buffer in response to the receiving core calling a third set interface of the publish-subscribe layer, in which the third set interface includes an orb_subscribe and an orb_copy; and store the topic message in a buffer space of a preset core.

Figure 10:
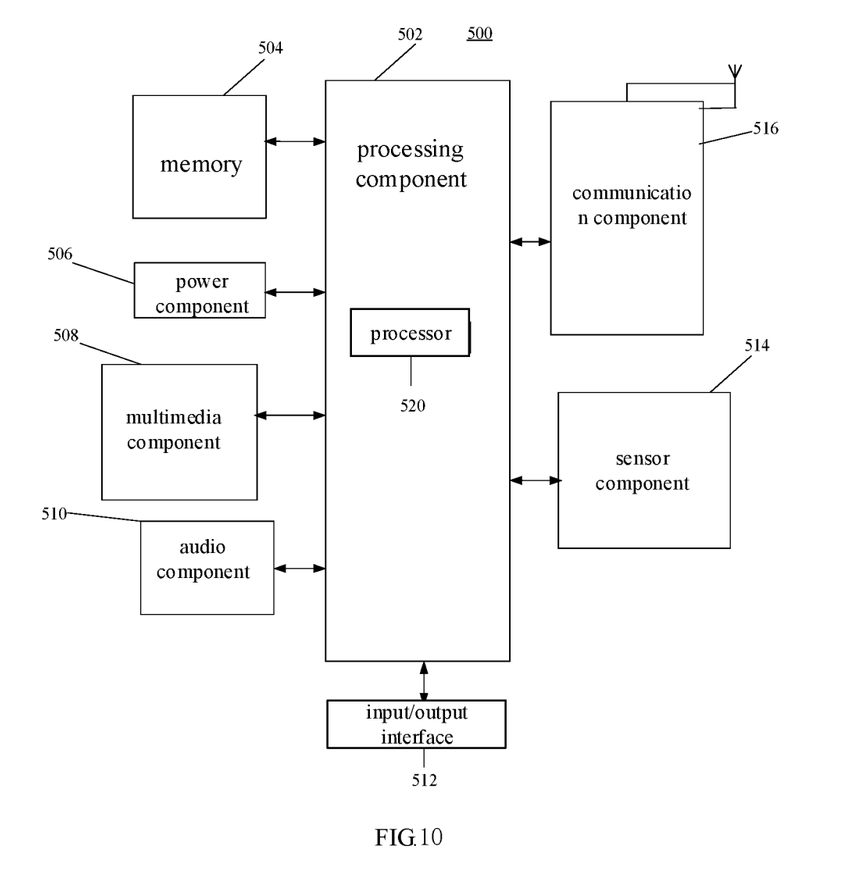
FIG. 10 is a block diagram illustrating an electronic device according to an example embodiment.

FIG. 10 is a block diagram of an electronic device. An electronic device is also provided in the present disclosure. For example, the device 500 can be a mobile phone, a computer, a digital broadcasting terminal, a messaging device, a game console, a tablet device, a medical device, a fitness device, a personal digital assistant, etc.

The device 500 may include one or more of the following components: a processing component 502, a memory 504, a power supply component 506, a multimedia component 508, an audio component 510, an input/output (I/O) interface 512, a sensor component 514, and a communication component 516.

The processing component 502 typically controls overall operations of the control device 500, such as the operations associated with display, telephone calls, data communications, camera operations, and recording operations. The processing component 502 may include one or more processors 520 to execute instructions to perform all or part of the steps in the above described methods. In addition, the processing component 502 may include one or more modules to facilitate the interaction between the processing component 502 and other components. For example, the processing component 502 may include a multimedia module to facilitate the interaction between the multimedia component 508 and the processing component 502.

The memory 504 is configured to store various types of data to support operations on the device 500. Examples of these data include instructions for any application or method operating on the device 500, such as contact data, phone book data, messages, pictures, videos, and so on. The memory 504 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 506 provides power for various components of the device 500. The power component 506 may include a power management system, one or more power supplies, and other components associated with the generation, management, and distribution of power for the device 500.

The multimedia component 508 includes a screen that provides an output interface between the device 500 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensor may not only sense the boundary of a touch or slide action, but also detect the duration and pressure related to the touch or slide operation. In some embodiments, the multimedia component 508 includes a front camera and/or a rear camera. When the device 500 is in an operation mode, such as a shooting mode or a video mode, the front camera and/or the rear camera may receive external multimedia data. Each of the front camera and the rear camera may be a fixed optical lens system or have focus and optical zoom capability.

The audio component 510 is configured to output and/or input audio signals. For example, the audio component 510 includes a microphone (MIC). When the device 500 is in an operation mode, such as a call mode, a recording mode, and a voice recognition mode, the microphone is configured to receive external audio signals. The received audio signal may be further stored in the memory 504 or transmitted via the communication component 516. In some embodiments, the audio component 510 further includes a speaker to output audio signals.

The I/O interface 512 provides an interface between the processing component 502 and the peripheral interface module. The peripheral interface module may be a keyboard, a click wheel, a button, and so on. These buttons may include but are not limited to: home button, volume button, start button, and lock button.

The sensor component 514 includes one or more sensors to provide status assessments of various aspects of the device 500. For example, the sensor component 514 may detect the On/Off state of the device 500 and relative position of components, for example, components as the display and the keypad of the device 500. The sensor component 514 may also detect changes of the position of the device 500 or one component of the device 500, and the presence or absence of contact between a user and the device 500, the position or acceleration/deceleration of the device 500, and the temperature change of the device 500. The sensor component 514 may include a proximity sensor configured to detect the presence of nearby objects without any physical contact. The sensor component 514 may also include a light sensor, such as a CMOS or CCD image sensor for the imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication between the device 500 and other devices. The device 500 may get access to a wireless network based on the communication standard, such as WiFi, 2G or 3G or their combinations. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module can be implemented based on Radio Frequency Identification (RFID) technology, Infrared Data Association (IrDA) technology, Ultra-Wide Band (UWB) technology, Blue Tooth (BT) technology and other technologies.

In an exemplary embodiment, the device 500 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above methods.

In another exemplary embodiment, there is also provided a non-transitory computer-readable storage medium including instructions, such as included in the memory 504, executable by the processor 520 in the device 500, for performing the above methods. For example, the computer-readable storage medium may be a Read-Only Memory (ROM), a Random Access Memory (RAM), a CD-ROM, a magnetic tape, a floppy disk, an optical data, a storage devices, etc. When the instructions in the storage medium are executed by the processor of the electronic device, the electronic device can execute the above method.

Other embodiments of the present disclosure will be apparent to those skilled in the art from consideration of the specification and practice of the invention disclosed here. The present disclosure is intended to cover any variations, uses, or adaptive changes of the invention. These variations, uses, or adaptive changes follow the general principles of the invention and include common knowledge or conventional technical means in the technical field which are not disclosed in the present disclosure. It is intended that the specification and examples be considered as exemplary only, with a true scope and spirit of the invention being indicated by the following claims.

It should be understood that the invention is not limited to the precise structure described above and shown in the drawings, and various modifications and changes can be made without departing from its scope. The scope of the present disclosure is only limited by the appended claims.

What is claimed is:

1. A method for multi-core communication, applicable to a multi-core communication system comprising a plurality of cores, a publish-subscribe layer, and a communication layer, the method comprising:

controlling, by the communication layer, the plurality of cores to run;

establishing, by the communication layer, a communication connection between a publishing core and a receiving core in the plurality of cores;

performing, by the publishing core, an operation on a topic message through calling a preset interface of the communication layer via the publish-subscribe layer comprising: calling, by the publishing core, a first set interface of the publish-subscribe layer, wherein the first set interface is configured to call the preset interface of the communication layer to transmit the topic message to a buffer; notifying the receiving core of a topic name of the topic message in an interrupt mode; and calling, by the publishing core, a second set interface of the publish-subscribe layer, wherein the second set interface is configured to call the preset interface of the communication layer to publish the topic message in the buffer, wherein the operation comprises one of:

publication of the topic message and broadcast of the topic name of the topic message;

establishing, by the publishing core and the receiving core, respective buffer spaces, wherein each of the respective buffer spaces correspond to a respective topic name; and accessing, by the receiving core, the topic message in response to the receiving core calling a third set interface of the publish-subscribe layer comprising: obtaining the topic message from the buffer in response to the receiving core calling the third set interface of the publish-subscribe layer; wherein the third set interface comprises an orb_subscribe and an orb_copy; and storing the topic message in a buffer space of a preset core, wherein the accessing comprises one of the following: subscribing to the topic message, and obtaining the topic message;

wherein controlling the plurality of cores to run comprises:

controlling a master core in the plurality of cores to boot, and controlling a remote core in the plurality of cores to boot based on the communication layer;

obtaining, by the remote core, a resource table; wherein the resource table is defined by the master core, and the resource table comprises: a regional division principle of an inter-core buffer; and dividing, by the master core and the remote core, the inter-core buffer thereof in a same way based on the resource table;

wherein establishing the communication connection between the publishing core and the receiving core in the plurality of cores based on the communication layer comprises:

creating respective ports in the publishing core and the receiving core based on the communication layer; and establishing, by the publishing core, the communication connection with the receiving core in response to a port name of the publishing core being same as a port name of the receiving core.

2. The method for multi-core communication of claim 1, wherein the communication layer is in an openAMP framework mode, and the publish-subscribe layer is in a uORB mode.

3. The method for multi-core communication of claim 1, wherein obtaining, by the remote core, the resource table comprises: obtaining, by the remote core, the resource table from an address space, wherein the master core loads the resource table to the address space.

4. The method for multi-core communication of claim 1, wherein the first set interface is an orb_advertise, and the second set interface is an orb_publish; wherein the preset interface is a rpmsg_send_message.

5. An electrical device, comprising:

a processor;

a memory configured to store instructions executable by the processor;

wherein, the processor is configured to execute a method for multi-core communication comprising:

controlling a plurality of cores of a multi-core communication system to run;

establishing a communication connection between a publishing core and a receiving core in the plurality of cores based on a communication layer of the multi-core communication system;

performing, by the publishing core, an operation on a topic message through calling a preset interface of the communication layer via a publish-subscribe layer of the multi-core communication system comprising: calling, by the publishing core, a first set interface of the publish-subscribe layer, wherein the first set interface is configured to call the preset interface of the communication layer to transmit the topic message to a buffer; notifying the receiving core of a topic name of the topic message in an interrupt mode; and calling, by the publishing core, a second set interface of the publish-subscribe layer, wherein the second set interface is configured to call the preset interface of the communication layer to publish the topic message in the buffer, wherein the operation comprises one of:

publication of the topic message and broadcast of the topic name of the topic message;

establishing, by the publishing core and the receiving core, respective buffer spaces, wherein each of the respective buffer spaces correspond to a respective topic name; and accessing the topic message in response to the receiving core calling a third set interface of the publish-subscribe layer comprising: obtaining the topic message from the buffer in response to the receiving core calling the third set interface of the publish-subscribe layer; wherein the third set interface comprises an orb_subscribe and an orb_copy; and storing the topic message in a buffer space of a preset core, wherein the accessing comprises one of the following: subscribing to the topic message, and obtaining the topic message;

wherein controlling the plurality of cores to run comprises:

controlling a master core in the plurality of cores to boot, and controlling a remote core in the plurality of cores to boot based on the communication layer;

obtaining, by the remote core, a resource table; wherein the resource table is defined by the master core, and the resource table comprises: a regional division principle of an inter-core buffer; and dividing, by the master core and the remote core, the inter-core buffer thereof in a same way based on the resource table;

wherein establishing the communication connection between the publishing core and the receiving core in the plurality of cores based on the communication layer comprises:

creating respective ports in the publishing core and the receiving core based on the communication layer; and establishing, by the publishing core, the communication connection with the receiving core in response to a port name of the publishing core being same as a port name of the receiving core.

6. The electrical device claim 5, wherein the communication layer is in an openAMP framework mode, and the publish-subscribe layer is in a uORB mode.

7. The electrical device claim 5, wherein the first set interface is an orb_advertise, and the second set interface is an orb_publish; wherein the preset interface is a rpmsg_send_message.

8. A non-transitory computer-readable storage medium, wherein when instructions in the non-transitory computer-readable storage medium are executed by a processor of an electronic device, the electronic device is caused to execute a method for multi-core communication comprising:

controlling a plurality of cores of a multi-core communication system to run;

establishing a communication connection between a publishing core and a receiving core in the plurality of cores based on a communication layer of the multi-core communication system;

performing, by the publishing core, an operation on a topic message through calling a preset interface of the communication layer via a publish-subscribe layer of the multi-core communication system comprising: calling, by the publishing core, a first set interface of the publish-subscribe layer, wherein the first set interface is configured to call the preset interface of the communication layer to transmit the topic message to a buffer; notifying the receiving core of a topic name of the topic message in an interrupt mode; and calling, by the publishing core, a second set interface of the publish-subscribe layer, wherein the second set interface is configured to call the preset interface of the communication layer to publish the topic message in the buffer, wherein the operation comprises one of:

publication of the topic message and broadcast of the topic name of the topic message;

establishing, by the publishing core and the receiving core, respective buffer spaces, wherein each of the respective buffer spaces correspond to a respective topic name; and accessing the topic message in response to the receiving core calling a third set interface of the publish-subscribe layer comprising: obtaining the topic message from the buffer in response to the receiving core calling the third set interface of the publish-subscribe layer;

wherein the third set interface comprises an orb_subscribe and an orb_copy; and storing the topic message in a buffer space of a preset core, wherein the accessing comprises one of the following: subscribing to the topic message, and obtaining the topic message;

wherein controlling the plurality of cores to run comprises:

controlling a master core in the plurality of cores to boot, and controlling a remote core in the plurality of cores to boot based on the communication layer;

obtaining, by the remote core, a resource table; wherein the resource table is defined by the master core, and the resource table comprises: a regional division principle of an inter-core buffer; and dividing, by the master core and the remote core, the inter-core buffer thereof in a same way based on the resource table;

wherein establishing the communication connection between the publishing core and the receiving core in the plurality of cores based on the communication layer comprises:

creating respective ports in the publishing core and the receiving core based on the communication layer; and establishing, by the publishing core, the communication connection with the receiving core in response to a port name of the publishing core being same as a port name of the receiving core.

* * * * *